(12) United States Patent
Teng

(10) Patent No.: US 10,910,875 B2
(45) Date of Patent: Feb. 2, 2021

(54) VEHICLE BACKUP DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Hao Teng, Mie (JP)

(73) Assignees: AutoNetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 6 days.

(21) Appl. No.: 16/341,487

(22) PCT Filed: Sep. 28, 2017

(86) PCT No.: PCT/JP2017/035126
§ 371 (c)(1),
(2) Date: Apr. 12, 2019

(87) PCT Pub. No.: WO2018/074168
PCT Pub. Date: Apr. 26, 2018

(65) Prior Publication Data
US 2019/0305587 A1 Oct. 3, 2019

(30) Foreign Application Priority Data
Oct. 19, 2016 (JP) .................................. 2016-204865

(51) Int. Cl.
*H02J 9/06* (2006.01)
*B60R 16/033* (2006.01)
(Continued)

(52) U.S. Cl.
CPC ............ *H02J 9/061* (2013.01); *B60R 16/033* (2013.01); *H02J 7/00* (2013.01); *H02J 7/14* (2013.01); *H02J 7/1446* (2013.01); *H02J 9/06* (2013.01)

(58) Field of Classification Search
CPC ......... B60R 16/00; B60R 16/033; G06F 1/00; G06F 1/30; H02J 1/00; H02J 1/082;
(Continued)

(56) References Cited

U.S. PATENT DOCUMENTS

| 2009/0179613 | A1 | 7/2009 | Masho |
| 2015/0001926 | A1 | 1/2015 | Kageyama et al. |
| 2015/0008731 | A1* | 1/2015 | Takahashi ........... F02N 11/0866 307/9.1 |

FOREIGN PATENT DOCUMENTS

| JP | 2004-322987 A | 11/2004 |
| JP | 2006-166534 A | 6/2006 |
| JP | 2008-236910 A | 10/2008 |

OTHER PUBLICATIONS

International Search Report, Application No. PCT/JP2017/035126, dated Nov. 7, 2017. ISA/Japan Patent Office.

* cited by examiner

*Primary Examiner* — Lincoln D Donovan
*Assistant Examiner* — Dave Mattison
(74) *Attorney, Agent, or Firm* — Honigman LLP

(57) ABSTRACT

In a backup device, a determination unit determines a first target voltage value of a second power supply unit when a starter switch for starting a vehicle is in an OFF state, so as to be lower than a second target voltage value of the second power supply unit when the starter switch is in an ON state, based on the second target voltage value, a value indicating the charging capability of the charging circuit, and a predetermined time limit. A control unit causes the charging
(Continued)

circuit to perform the charging operation upon the starter switch being switched to an ON state, such that the charged voltage of the second power supply unit reaches the second target voltage value, and causes the discharging circuit to perform the discharging operation upon the starter switch being switched to an OFF state, such that the charged voltage reaches the first target voltage value.

4 Claims, 7 Drawing Sheets

(51) Int. Cl.
    *H02J 7/14*          (2006.01)
    *H02J 7/00*          (2006.01)

(58) Field of Classification Search
    CPC .............. H02J 2310/00; H02J 2310/46; H02J 2310/48; H02J 7/00; H02J 7/0029; H02J 7/00712; H02J 7/14; H02J 7/1446; H02J 7/34; H02J 7/345; H02J 9/00; H02J 9/06; H02J 9/061; H02J 9/062
    USPC .......................................... 307/66
    See application file for complete search history.

VEHICLE BACKUP DEVICE

CROSS-REFERENCE TO RELATED APPLICATIONS

This application is the U.S. national stage of PCT/JP2017/035126 filed Sep. 28, 2017, which claims priority of Japanese Patent Application No. JP 2016-204865 filed Oct. 19, 2016, the contents of which are incorporated herein.

TECHNICAL FIELD

The present disclosure relates to a vehicle backup device.

BACKGROUND

If a failure occurs in a main power supply included in a vehicle power supply system, power supply to loads is shut off, and the power supply system cannot perform electrical operations (e.g. various kinds of electronic control). As a configuration that may be able to solve such a problem, a configuration that is equipped with an auxiliary power supply is known. For example, according to technology disclosed in JP2004-322987A, a capacitor unit in which a plurality of electric double-layer capacitors are used is employed as an auxiliary power supply.

In a case where capacitors are used as an auxiliary power supply, there is a problem in that the capacitors gradually deteriorate if the charged voltage is kept high for a long period of time. In this regard, according to the vehicle power supply device disclosed in JP2004-322987A, capacitors (a power supply backup unit) are charged after the vehicle has started operating and the charged voltage is increased, and thus the capacitors are used as an auxiliary power supply when the vehicle is operating, and when the vehicle stops operating, the capacitors are discharged so that the charged voltage is lowered, and thus the deterioration of the capacitors is suppressed.

However, simply discharging the capacitors when the vehicle stops operating as disclosed in JP2004-322987A may lead to an increase in charging time or a decrease in the effect of suppressing deterioration. For example, if the charged voltage of the capacitors is excessively lowered after the vehicle has stopped operating, a long charging time is required to increase the charged voltage to a desirable level after the vehicle has started operating. On the other hand, if the amount of discharge from the capacitors from when the vehicle has stopped operating is too small, the effect of suppressing deterioration decreases.

The present disclosure has been made in view of the above-described situation, and aims to realize a vehicle backup device that can swiftly increase the charged voltage of a second power supply unit to a target level after the vehicle has started operating, and lower the charged voltage of the second power supply unit to an appropriate level after the vehicle has stopped operating to suppress deterioration.

SUMMARY

The present disclosure is a vehicle backup device that is to be included in a vehicle power supply system that is provided with a first power supply unit that is electrically connected to a first conductive path, and a second power supply unit that serves as a power supply source at least when power supply from the first power supply unit is abnormal, the vehicle backup device controlling charging and discharging of the second power supply unit. The vehicle backup device includes a charging circuit, a voltage detection unit, a current detection unit, a determination unit and a control unit. The charging circuit performs a charging operation to charge the second power supply unit, and a charging stop operation to stop charging the second power supply unit, based on power supplied from the first power supply unit via the first conductive path; a discharging circuit that performs a discharging operation to discharge the second power supply unit, and a discharging stop operation to stop discharging the second power supply unit. The voltage detection unit detects the voltage of the first conductive path. The current detection unit detects a current flowing through the first conductive path. The determination unit determines a first target voltage value that is a target voltage value of the second power supply unit when a starter switch for starting a vehicle is in an OFF state, so as to be lower than a second target voltage value that is a target voltage value of the second power supply unit when the starter switch is in an ON state, based on the second target voltage value, the voltage of the first conductive path detected by the voltage detection unit while the charging circuit performs the charging operation, the current flowing through the first conductive path detected by the current detection unit while the charging circuit performs the charging operation, and a predetermined time limit. The control unit causes the charging circuit to perform the charging operation upon the starter switch being switched to an ON state, such that the charged voltage of the second power supply unit reaches the second target voltage value, and causes the discharging circuit to perform the discharging operation upon the starter switch being switched to an OFF state, such that the charged voltage of the second power supply unit reaches the first target voltage value determined by the determination unit.

Advantageous Effects of Disclosure

When the starter switch for starting the vehicle is in an OFF state, the backup device sets the first target voltage value, which is the target voltage value of the charged voltage of the second power supply unit, so as to be lower than the target voltage value in an ON state (the second target voltage value). In this way, it is possible to keep the charged voltage of the second power supply unit relatively low during a period in which the vehicle's operation has stopped, and accordingly it is possible to suppress the deterioration of the second power supply unit. Furthermore, instead of simply lowering the target voltage value (the first target voltage value) of the charged voltage of the second power supply unit during a period in which the vehicle's operation has stopped, it is possible to set the target voltage value based on the target voltage value of the second power supply unit when the switch is in an ON state (the second target voltage value), a value indicating the charging capability of the charging circuit, and the predetermined time limit. That is to say, it is possible to more appropriately set the target voltage value of the second power supply unit during a period in which the vehicle's operation has stopped (the first target voltage value) so as to match an envisaged state of charging when the switch is thereafter switched to an ON state, and a demanded time limit.

In this way, the present configuration seeks an appropriate target voltage value (first target voltage value) of the second power supply unit in an OFF state. Thus, it is possible to swiftly increase the charged voltage of the second power supply unit to a target level after the vehicle has started operating, and it is possible to lower the charged voltage of the second power supply unit to an appropriate level after the vehicle has stopped operating, to suppress deterioration.

DETAILED DESCRIPTION OF PREFERRED EMBODIMENTS

Figure 1:
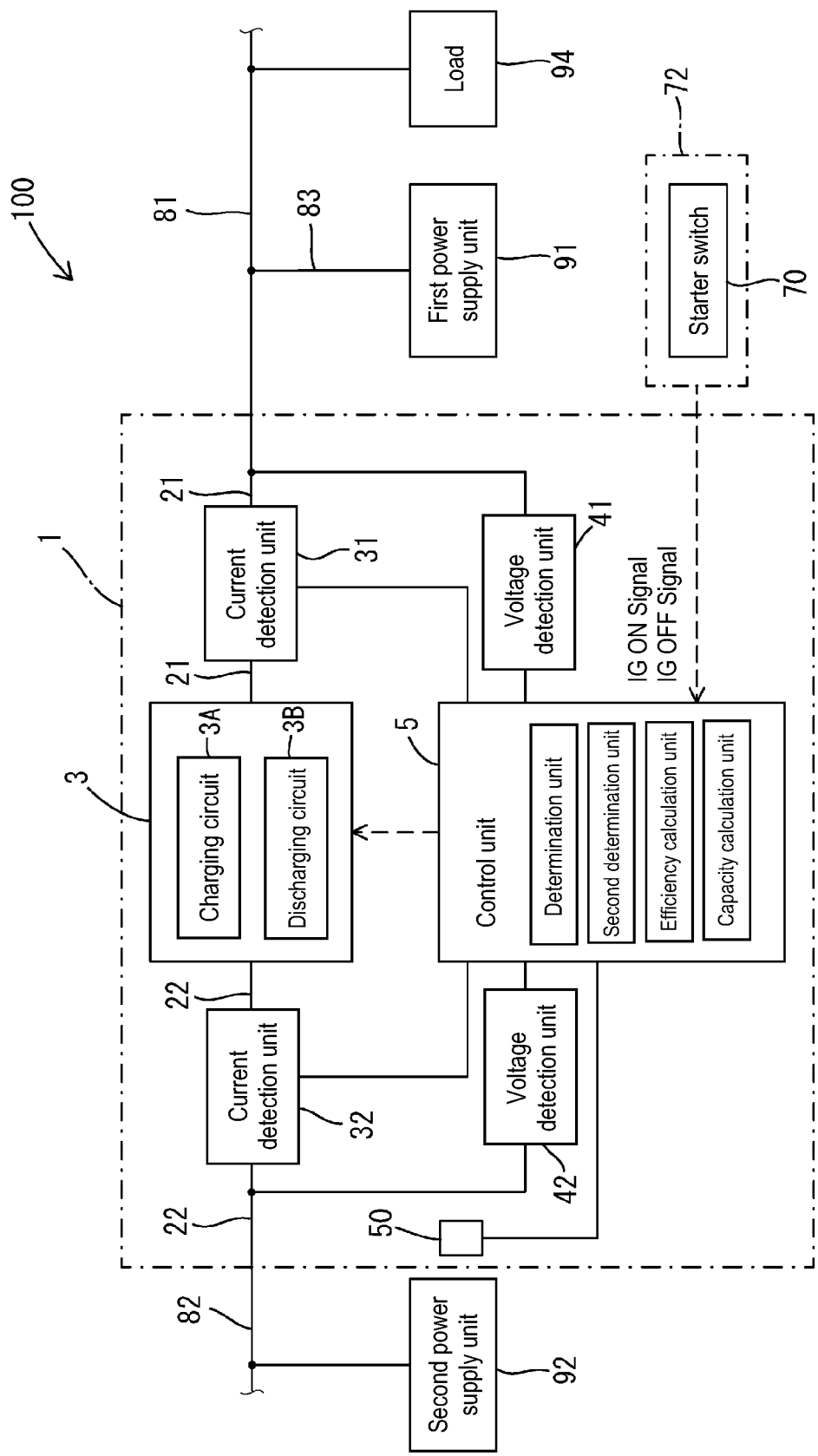
FIG. 1 is a block diagram schematically showing a vehicle power supply system that includes a backup device according to a first embodiment.

The following describes a preferable example of the present disclosure. However, the present disclosure is not limited to the following example.

The charging circuit may include a voltage conversion unit that steps up or down a voltage applied to a first conductive path that is electrically connected to the first power supply unit, and applies the resulting voltage to a second conductive path that is electrically connected to the second power supply unit. Furthermore, the backup device may include a voltage detection unit that detects the voltage of the first conductive path; a current detection unit that detects a current flowing through the first conductive path; a temperature detection unit that detects the temperature of the second power supply unit; an efficiency calculation unit that calculates the efficiency of the voltage conversion unit based on the voltage detected by the voltage detection unit; and a capacity calculation unit that calculates the capacity of the second power supply unit based on the temperature detected by the temperature detection unit. The determination unit may determine the first target voltage value based on the voltage of the first conductive path detected by the voltage detection unit, the current flowing through the first conductive path detected by the current detection unit, the efficiency of the voltage conversion unit calculated by the efficiency calculation unit, the capacity of the second power supply unit calculated by the capacity calculation unit, the second target voltage value, and the time limit.

With such a configuration, the backup device can determine the target voltage value (the target voltage value) of the second power supply unit when the starter switch is in an OFF state such that, in addition to the target voltage value (the second target voltage value) of the second power supply unit when the starter switch is in an OFF state, and the predetermined time limit, the voltage and the current of the charging path (the first conductive path) from the first power supply unit to the second power supply unit, the efficiency of the voltage conversion unit, and the capacity of the second power supply unit are reflected to the target voltage value. That is to say, the backup device can more appropriately set the target voltage value (the first target voltage value) of the second power supply unit during a period in which the vehicle's operation has stopped, such that an envisaged state of charging after the starter switch has been turned ON (after the vehicle's operation has started) is more specifically and more precisely reflected to the target voltage value.

The backup device may further include a second determination unit that determines the second target voltage value based on a predetermined continuous output period that has been determined in advance as a requested value for the second power supply unit, a lower limit voltage that has been determined in advance as a lower limit value that is dischargeable from the second power supply unit, and a value indicating the discharging capability of the discharging circuit.

The backup device with such a configuration can more appropriately set not only the target voltage value of the second power supply unit when the starter switch for starting the vehicle is in an OFF state (the first target voltage value), but also the target voltage value when the starter switch is in an ON state (the second target voltage value). Specifically, the backup device can make appropriate settings based on the predetermined continuous output period determined in advance as a requested value for the second power supply unit, the lower limit voltage determined in advance as the value of the dischargeable lower limit of the second power supply unit, and the value indicating the discharging capability of the discharging circuit such that the time and discharging environment that are required after the switch has been switched to the ON state are specifically reflected to the settings.

The following describes a specific embodiment of the present disclosure.

First Embodiment

FIG. 1 shows a block diagram for a vehicle power supply system 100 (hereinafter also simply referred to as a power supply system 100) that includes a vehicle backup device 1 (hereinafter also simply referred to as a backup device 1) according to a first embodiment.

The power supply system 100 includes a first power supply unit 91 that serves as a main power supply for supplying power to a load 94 (a power supply target), a second power supply unit 92 that serves as a power supply source when power supply from at least the first power supply unit 91 is shut off, and the backup device 1 that has the function of swiftly causing the second power supply unit 92 to discharge electricity when power supply from the first power supply unit 91 is shut off, and the power supply system 100 is configured as a system that supplies power to the load 94, using the first power supply unit 91 or the second power supply unit 92 as a power supply source.

The power supply system 100 shown in FIG. 1 is configured to, in a case where power supply from the first power supply unit 91 is in a normal state, apply a voltage that is based on the output voltage of the first power supply unit 91 to a wire portion 81 that is configured as a wire portion, and apply power from the first power supply unit 91 to the load 94 (a power supply target) via the wire portion 81. "A case where power supply from the first power supply unit 91 is in a normal state" means a case where the output voltage of the first power supply unit 91 is higher than a predetermined value, and, for example, a case where a voltage (an electrical potential) at a first conductive path 21 is higher than a predetermined threshold value voltage in a state where electricity is not discharged from the second power supply unit 92.

The first power supply unit 91 is a vehicle power supply that can supply power to the load 94 (a power supply target), and is configured as a well-known on-board battery such as a lead battery, for example. The high potential-side terminal of the first power supply unit 91 is electrically connected to the wire portion 81, and the first power supply unit 91 applies a predetermined voltage (hereinafter also referred to as a +B voltage) to the wire portion 81. The low potential-side terminal of the first power supply unit 91 is connected to ground, for example.

The wire portion 81 is a path for supplying power from the first power supply unit 91 to the load 94 (a power supply target), and when power supply from the first power supply unit 91 is in an abnormal state, the wire portion 81 can function as a path for supplying power from the second power supply unit 92 to the load 94. The wire portion 81 is electrically connected to the first conductive path 21 of the backup device 1, and the output voltage of the first power supply unit 91 is applied to the first conductive path 21.

The second power supply unit 92 is constituted by a well-known electricity storage means such as an electric double-layer capacitor (EDLC), for example. The high potential-side terminal of the second power supply unit 92 is electrically connected to a wire portion 82, and the wire portion 82 is electrically connected to a second conductive path 22 of the backup device 1. The low potential-side terminal of the second power supply unit 92 is connected to ground, for example. The second power supply unit 92 is electrically connected to a charging/discharging circuit unit 3 via the wire portion 82 and the second conductive path 22, and is charged or discharged by the charging/discharging circuit unit 3. The output voltage of the second power supply unit 92 when fully charged may be higher or lower than the output voltage of the first power supply unit 91 when fully charged.

The load 94 is one example of a power supply target, and is configured as a well-known electronic component for a vehicle. A preferable example of the load 94 is an electronic component that is desired to be supplied with power even when a failure occurs in the first power supply unit 91, such as an ECU or an actuator in a shift-by-wire system, for example. The load 94 operates based on power supplied from the first power supply unit 91 when in the above-described normal state, and operates based on power supplied from the second power supply unit 92 when in an abnormal state.

The starter switch 70 is configured as a well-known ignition switch. The starter switch 70 is switched to an ON state when a predetermined starting operation for starting the engine (an operation for turning the ignition switch ON) is performed on an operation unit (not shown) provided in a vehicle, and is switched to an OFF state when a predetermined stop operation for stopping the engine (an operation for turning the ignition switch OFF) is performed on the operation unit. In the present configuration, when the starter switch 70 is in an ON state, an ignition ON signal (hereinafter also referred to as an IG ON signal), which indicates that the starter switch 70 is in an ON state, is input from an external device 72, which is externally provided for the backup device 1, to a control unit 5 of the backup device 1. When the starter switch 70 is in an OFF state, an ignition OFF signal (hereinafter also referred to as an IG OFF signal), which indicates that the starter switch 70 is in an OFF state, is input from the external device 72 to the control unit 5.

The backup device 1 mainly includes the first conductive path 21, the second conductive path 22, the charging/discharging circuit unit 3, current detection units 31 and 32, voltage detection units 41 and 42, a temperature detection unit 50, the control unit 5, and so on.

In the backup device 1, the first conductive path 21 is a wire that is electrically connected to the high potential-side terminal of the first power supply unit 91, and is configured such that a predetermined DC voltage corresponding to the output voltage of the first power supply unit 91 is applied thereto. The second conductive path 22 is a wire that is electrically connected to the high potential-side terminal of the second power supply unit 92, and is configured such that a predetermined DC voltage corresponding to the output voltage of the second power supply unit 92 is applied thereto.

The charging/discharging circuit unit 3 need only function as a charging circuit 3A that charges the second power supply unit 92 based on power supplied from the first power supply unit 91 via the first conductive path 21, and as a discharging circuit 3B that causes the second power supply unit 92 to discharge electricity, and supplies the discharged current to the wire portion 81. This charging/discharging circuit unit 3 is configured as shown in FIG. 2, for example.

Figure 2:
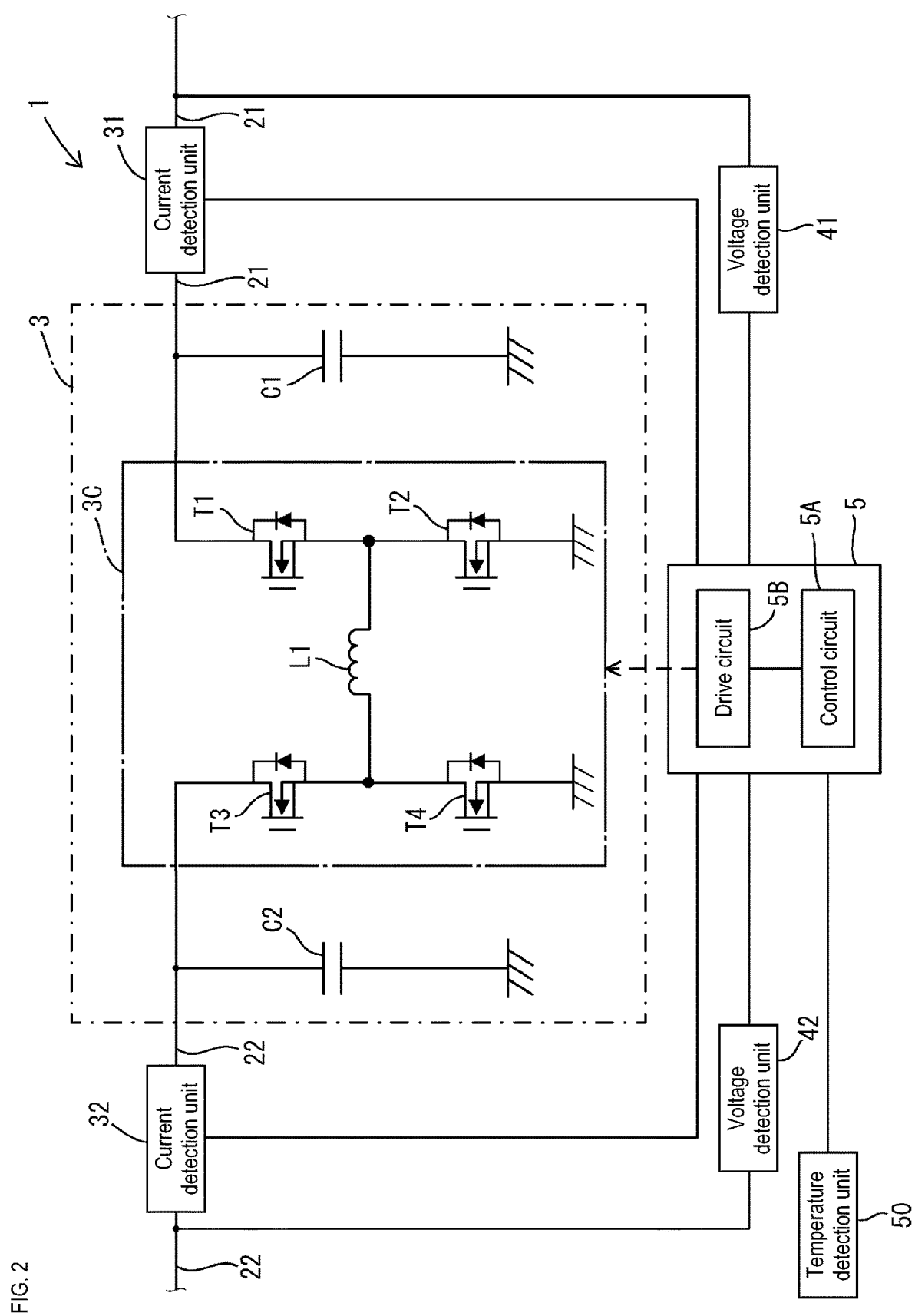
FIG. 2 is a circuit diagram schematically showing the backup device according to the first embodiment.

The charging/discharging circuit unit 3 shown in FIG. 2 is configured as a bidirectional step-up/down DC-DC converter, and has the function of stepping up or stepping down a DC voltage applied to one of the first conductive path 21 and the second conductive path 22, and outputting the resulting voltage to the other conductive path.

A voltage conversion unit 3C functions as the charging circuit 3A and the discharging circuit 3B shown in FIG. 1. The voltage conversion unit 3C is provided between the first conductive path 21 and the second conductive path 22, and performs a voltage conversion operation to step up or step down an input voltage through ON/OFF operations of switching elements T1, T2, T3, and T4, and outputs the resulting voltage. The voltage conversion unit 3C may operate in a first mode to step up or step down a voltage applied to the first conductive path 21 and apply a desired voltage to the second conductive path 22, or operate in a second mode to step up or step down a voltage applied to the second conductive path 22 and apply a desired voltage to the first conductive path 21. The first mode is a charging mode for charging the second power supply unit 92, and the second mode is a discharging mode for discharging the second power supply unit 92.

The voltage conversion unit 3C includes the switching elements T1, T2, T3, and T4 and a coil L1, which are arranged in an H bridge structure. Furthermore, the voltage conversion unit 3C includes a capacitor C1 that is interposed between the first conductive path 21 and ground, and a capacitor C2 that is interposed between the second conductive path 22 and ground. Each of the switching elements T1, T2, T3, and T4 is configured as an N-channel type MOSFET. The first conductive path 21 is connected to the drain of the switching element T1, and the drain of the switching element T2 and one end of a coil 8 are connected to the source of the switching element T1. The second conductive path 22 is connected to the drain of the switching element T3, and the drain of the switching element T4 and the other end of the coil 8 are connected to the source of the switching element T3. The respective sources of the switching elements T2 and T4 are connected to ground. Signals from a drive circuit 5B, which will be described later, are input to the respective gates of the switching elements T1, T2, T3, and T4. Note that individual signal lines connected to the respective gates of the switching elements T1, T2, T3, and T4 are omitted from FIG. 2.

The current detection units 31 and 32 are both configured as well-known current detection circuits. The current detection unit 31 is a current detection circuit that detects a current flowing through the first conductive path 21, and includes, for example, a shunt resistance that is provided in the first conductive path 21, and a differential amplifier that outputs an analog voltage value obtained by amplifying a voltage across the shunt resistance to the control unit 5. The current detection unit 32 is a current detection circuit that detects a current flowing through the second conductive path 22, and includes, for example, a shunt resistance that is provided in the second conductive path 22, and a differential amplifier that outputs an analog voltage value obtained by amplifying a voltage across the shunt resistance to the control unit 5. The control unit 5 keeps track of the value of a current flowing through the first conductive path 21, based on an input value from the current detection unit 31 (a detection value detected by the current detection unit 31), and keeps track of the value of a current flowing through the second conductive path 22, based on an input value from the current detection unit 32 (a detection value detected by the current detection unit 32).

The voltage detection units 41 and 42 are both configured as well-known voltage detection circuits. The voltage detection unit 41 inputs a value indicating the voltage (an electrical potential) of the first conductive path 21 (e.g. the value of the voltage of the first conductive path 21, or a value obtained by dividing the voltage value of the first conductive path 21 using a voltage dividing circuit) to the control unit 5 as a detection value. The voltage detection unit 42 inputs a value indicating a voltage (an electrical potential) of the second conductive path 22 (e.g. the value of the voltage of the second conductive path 22, or a value obtained by dividing a voltage value of the second conductive path 22 using a voltage dividing circuit) to the control unit 5 as a detection value. The control unit 5 keeps track of a voltage value (an electrical potential) at the first conductive path 21, based on an input value from the voltage detection unit 41 (a detection value detected by the voltage detection unit 41), and keeps track of a voltage value (an electrical potential) at the second conductive path 22, based on an input value from the voltage detection unit 42 (a detection value detected by the voltage detection unit 42).

The temperature detection unit 50 is constituted by a well-known temperature sensor, and is disposed in contact with the surface of the second power supply unit 92, or is disposed close to the second power supply unit 92, for example. The temperature detection unit 50 generates an analog voltage value indicating the temperature at a position where the temperature detection unit 50 is disposed (a position in the vicinity of the second power supply unit 92), and inputs the value to the control unit 5.

The control unit 5 includes, for example, a control circuit 5A that is configured as a microcomputer or the like, and a drive circuit 5B that generates a driving signal that is to be supplied to the voltage conversion unit 3C, and controls a charging operation and a discharging operation performed by the charging/discharging circuit unit 3. The control circuit 5A includes a processing device such as a CPU, a memory such as a ROM or a RAM, an A/D convertor, and so on. The control circuit 5A performs feedback control using a well-known method, based on current values and voltage values input from the current detection units 31 and 32 and the voltage detection units 41 and 42, and a target voltage value that has been set by the control circuit 5A, to set the duty cycle of a PWM signal that is to be supplied to a voltage conversion unit 3C. Thereafter, the control circuit 5A outputs a PWM signal that has the duty cycle thus set, to the drive circuit 5B. The drive circuit 5B is a circuit that outputs a control signal for turning the switching elements T1, T2, T3, and T4 ON/OFF. The drive circuit 5B selects a pair of elements to which the PWM signal is to be output, from among the switching elements T1, T2, T3, and T4, and complementarily outputs the PWM signal to the pair of elements thus selected. Also, for the gates of the switching elements to which the PWM signal is not to be output, the drive circuit 5B outputs a signal for causing such switching elements to perform an ON operation or an OFF operation.

The following description of the present embodiment describes an example in which the charged voltage (output voltage) of the second power supply unit 92 in FIG. 1 when fully charged is lower than the charged voltage (output voltage) of the first power supply unit 91 in FIG. 1 when fully charged. In the power supply system 100 shown in FIG. 1, the charged voltage (output voltage) of the first power supply unit 91 is kept at or near a predetermined value (e.g. approximately 12V) that is higher than the charged voltage (output voltage) of the second power supply unit 92.

When operating in the first mode (charging mode), the control unit 5 shown in FIG. 2 causes the voltage conversion unit 3C to perform a step-down operation to apply an output voltage of a desired target voltage value to the second conductive path 22, using the first conductive path 21 as an input-side conductive path and the second conductive path 22 as an output-side conductive path. When operating in the first mode, the control unit 5 complementarily outputs the PWM signal to the respective gates of the switching elements T1 and T2 while setting a dead time. The control unit 5 outputs an OFF signal to the gate of the switching element T2 as long as the control unit 5 outputs an ON signal to the gate of the switching element T1, and the control unit 5 outputs an OFF signal to the gate of the switching element T1 as long as the control unit 5 outputs an ON signal to the gate of the switching element T2. In parallel with such output of the PWM signal, the control unit 5 continuously outputs an ON signal to the gate of the switching element T3, and continuously outputs an OFF signal to the gate of the switching element T4. That is to say, the switching element T3 is kept in an ON state, and the switching element T4 is kept in an OFF state. The output voltage applied to the second conductive path 22 by the voltage conversion unit 3C in the first mode is determined based on the duty cycle of the PWM signal that the control unit 5 supplies to the gate of the switching element T1.

In this way, the voltage conversion unit 3C functions as the charging circuit 3A shown in FIG. 1, and when the control unit 5 performs control in the first mode, the voltage conversion unit 3C functions to perform a charging operation to charge the second power supply unit 92, and when the control unit 5 does not perform control in the first mode (e.g. when the control unit 5 stops the operation of the voltage conversion unit 3C), the voltage conversion unit 3C functions to perform a charging stop operation to stop charging the second power supply unit 92.

When operating in the second mode (discharging mode), the control unit 5 causes the voltage conversion unit 3C to perform a step-up operation to apply an output voltage of a desired target voltage value to the first conductive path 21, using the second conductive path 22 as an input-side conductive path and the first conductive path 21 as an output-side conductive path. When operating in the second mode, the control unit 5 complementarily outputs the PWM signal to the respective gates of the switching elements T1 and T2 while setting a dead time. The control unit 5 outputs an OFF signal to the gate of the switching element T1 as long as the control unit 5 outputs an ON signal to the gate of the switching element T2, and the control unit 5 outputs an OFF signal to the gate of the switching element T2 as long as the control unit 5 outputs an ON signal to the gate of the switching element T1. In parallel with such output of the PWM signal, the control unit 5 continuously outputs an ON signal to the gate of the switching element T3, and continuously outputs an OFF signal to the gate of the switching element T4. That is to say, the switching element T3 is kept in an ON state, and the switching element T4 is kept in an OFF state. The output voltage applied to the first conductive path 21 by the voltage conversion unit 3C in the second mode is determined based on the duty cycle of the PWM signal that the control unit 5 supplies to the gate of the switching element T2.

In this way, the voltage conversion unit 3C functions as the discharging circuit 3B shown in FIG. 1, and when the control unit 5 performs control in the second mode, the voltage conversion unit 3C functions to perform a discharging operation to discharge the second power supply unit 92, and when the control unit 5 does not perform control in the second mode (e.g. when the control unit 5 stops the operation of the voltage conversion unit 3C), the voltage conversion unit 3C functions to perform a discharging stop operation to stop discharging the second power supply unit 92.

The following describes specific flows of charging control and discharging control that are performed by the backup device 1.

The power supply system 100 shown in FIG. 1 is configured as a system that causes the first power supply unit 91 to operate as a main power supply, and causes the second power supply unit 92 to operate as a power supply source when power supply from the first power supply unit 91 is in an abnormal state. Charging and discharging of the second power supply unit 92 are controlled by the backup device 1 as described below.

In the backup device 1 shown in FIGS. 1 and 2, the control unit 5 can monitor the state of the starter switch 70. In the present configuration, in a vehicle that is equipped with the vehicle power supply system 100, upon a user performing a starting operation (an ON operation) to switch the starter switch 70 (the ignition switch) to an ON state, the starter switch 70 is switched from an OFF state to an ON state. When the starter switch 70 is in an OFF state, the IG OFF signal is continuously input from the external device 72 to the control unit 5. Upon the starter switch 70 being switched from an OFF state to an ON state, the single input from the external device 72 to the control unit 5 is switched from the IG OFF signal to the IG ON signal. Note that the IG ON signal is continuously input to the control unit 5 as long as the starter switch 70 is in an ON state.

Figure 3:
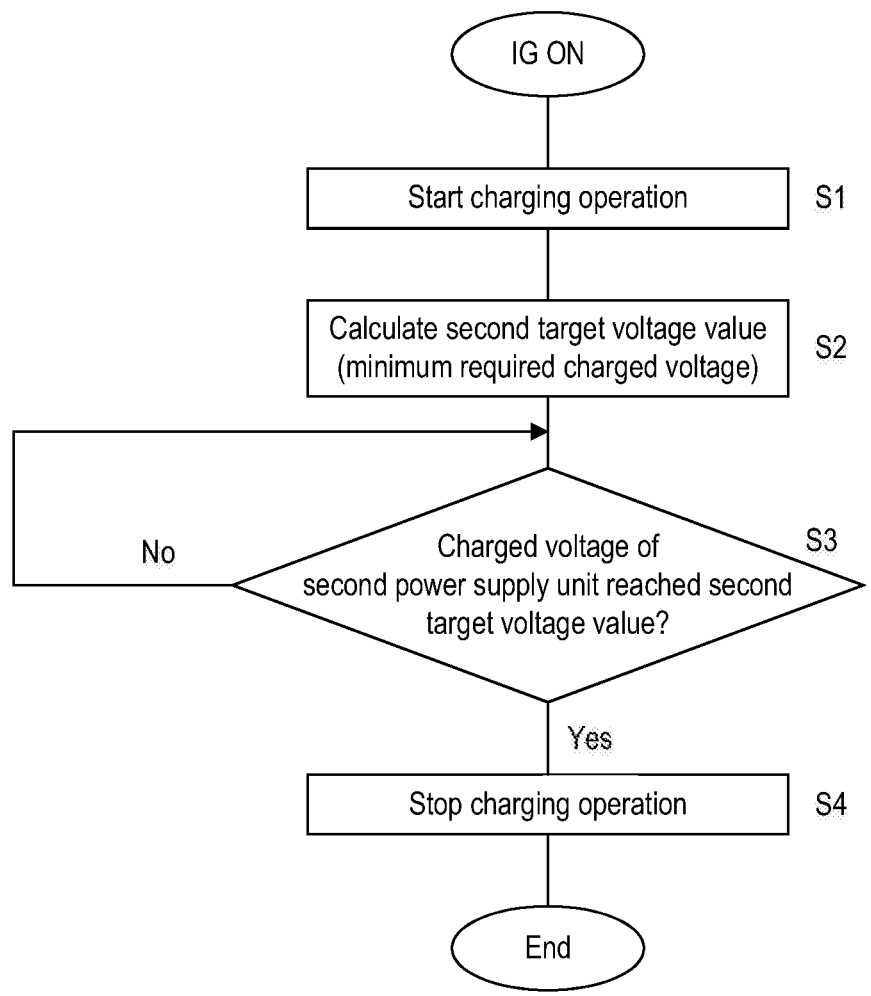
FIG. 3 is a flowchart showing an example of a flow of charging control that is performed by the backup device according to the first embodiment.

First, the following describes control that is to be performed when the starter switch 70 is switched from an OFF state to an ON state with reference to FIG. 3.

Upon detecting that the signal input from the external device 72 to the control unit 5 has switched from the IG OFF signal to the IG ON signal, the control unit 5 performs charging control shown in FIG. 3. When the control unit 5 starts the charging control shown in FIG. 3, the control unit 5 first performs processing in step S1 to cause the voltage conversion unit 3C to perform the above-described charging operation. Specifically, in step S1, the control unit 5 starts operating in the above-described first mode (charging mode), and causes the voltage conversion unit 3C to perform a step-down operation to apply an output voltage of a desired target voltage value to the second conductive path 22, using the first conductive path 21 as an input-side conductive path and the second conductive path 22 as an output-side conductive path. The output voltage value (target voltage value) that the voltage conversion unit 3C applies to the second conductive path 22 may be, for example, substantially the same as the output voltage value of the second power supply unit 92 when fully charged, or slightly higher than this value.

After performing the processing in step S1 to cause the voltage conversion unit 3C to start a charging operation, the control unit 5 performs processing in step S2 to determine a second target voltage value Vt2. The second target voltage value Vt2 is a target value of the charged voltage of the second power supply unit 92 when the starter switch 70 is in an ON state. In the present configuration, the control unit 5 is an example of the second determination unit that determines the second target voltage value Vt2, and determines the second target voltage value Vt2 based on a predetermined continuous output period T that has been determined in advance as a requested value for the second power supply unit 92, a lower limit voltage X that has been determined in advance as a lower limit value that is dischargeable from the second power supply unit 92, and values that indicate the discharging capability of the discharging circuit 3B (an output voltage value Vout, an output current value Tout, and so on). The output voltage value Vout and the output current value Tout are a voltage value and a current value that are output from the voltage conversion unit 3C in a case where the second power supply unit 92 is caused to perform an operation to discharge electricity when an abnormality has occurred. The continuous output period T is the shortest period of time during which the output voltage value Vout and the output current value Tout should be continuously output from the voltage conversion unit 3C in a case where the voltage conversion unit 3C is caused to perform a discharging operation to discharge the second power supply unit 92 when an abnormality has occurred.

Specifically, when the control unit 5 causes the voltage conversion unit 3C to perform a discharging operation with the output voltage value at Vout and the output current value at Tout, the charged voltage (output voltage) of the second power supply unit 92 at a start time t(1) is determined as the second target voltage value Vt2, through a backward calculation with reference to the lower limit voltage X, such that the charged voltage (output voltage) of the second power supply unit 92 will be the predetermined lower limit voltage X at the time (t(n)) when the continuous output period T has elapsed from the start time t(1) of the discharging operation. That is to say, in a case where the charged voltage (output voltage) of the second power supply unit 92 at the start time t(1) of the discharging operation is at the second target voltage value Vt2, if the control unit 5 causes the voltage conversion unit 3C to perform the discharging operation with the output voltage value at Vout and the output current value at Tout during the continuous output period T, the charged voltage (output voltage) of the second power supply unit 92 will be the lower limit voltage X at time t(n) when the continuous output period T has elapsed from the start time t(1). The second target voltage value Vt2 is determined so as to satisfy such a relationship.

The second target voltage value Vt2 denotes a charged voltage (the minimum required charged voltage) that is required to continue a discharging operation for at least the time period T at the output voltage value and the output current value that are to be applied to the first conductive path 21 being set to the output voltage value Vout and the output current value Iout, respectively, and the second target voltage value Vt2 can be determined as follows.

$$Vt2 = Vd + X + \int_{t(1)}^{t(n)} \Delta V(t(n)) \times dt \qquad [\text{Math. 1}]$$

Figure 5:
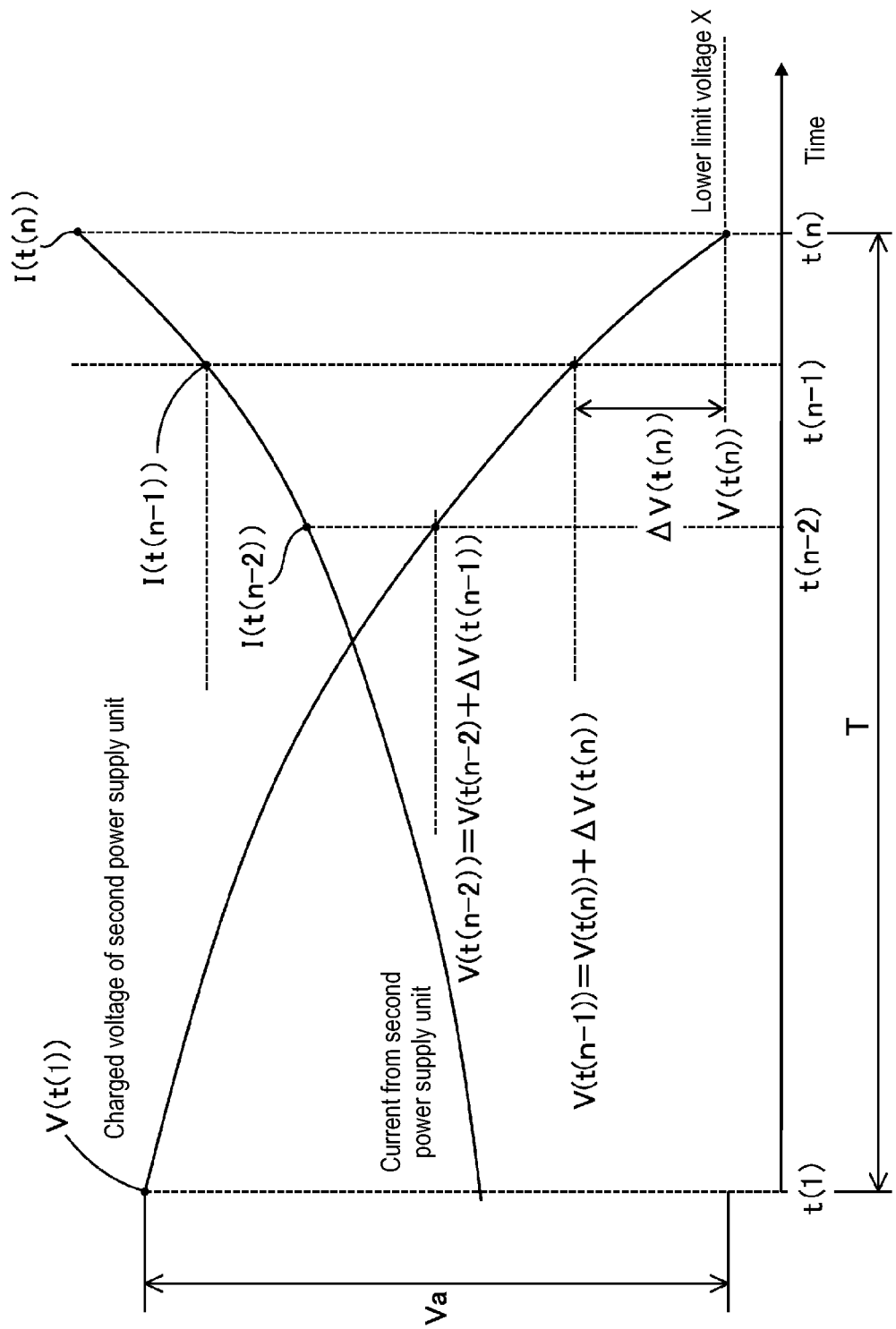
FIG. 5 is a graph showing changes in a charged voltage, changes in an output current, and so on after a second power supply unit of the backup device according to the first embodiment has started discharging electricity.

When time t(1) denotes the discharging start time, in a case where a discharging operation is performed from time t(1) at the output voltage value Vout and the output current value Tout, the charged voltage of the second power supply unit 92 decreases due to the voltage conversion unit 3C causing the second power supply unit 92 to discharge a current during the continuous output period T, as shown in FIG. 5. Note that the influence of a voltage drop caused by an internal resistance of the second power supply unit 92 is excluded from FIG. 5. In FIG. 5, V(t(n)) denotes the value of the charged voltage of the second power supply unit 92 at time t(n) in a case where a discharging operation has been performed at the output voltage value Vout and the output current value Iout. Here, time t(n) is the continuous output period T, and V(t(n)) is the lower limit voltage X. FIG. 5 illustrates that, in a case where the discharging operation of the voltage conversion unit 3C is continued during the time period T from time t(1) to time t(n), the charged voltage decreases by Va due to a discharged current discharged from the second power supply unit 92. This means that the charged voltage decreases by Va due to an energy loss caused by discharge.

Math. 1 determines the second target voltage value Vt2, where, in addition to a decrease in the charged voltage caused by such an energy loss, the lower limit voltage X and a maximum voltage drop Vd that is caused by the internal resistance of the second power supply unit 92 are taken into consideration. ΔV(t(n)) in Math. 1 is calculated as follows.

First, V(t(n)) is set to the lower limit voltage X, which is expressed by Math. 2 below.

$$V(t(n)) = X \qquad [\text{Math. 2}]$$

The efficiency (converter efficiency) Y(t(n)) of the voltage conversion unit 3C at t(n) can be expressed by Math. 3 below. In Math. 3, A, B, and C are coefficients (fixed values) that are determined based on a specific configuration of the voltage conversion unit 3C. The efficiency (converter efficiency) Y(t(n)) is the efficiency of the voltage conversion unit 3C when the voltage conversion unit 3C operates in the second mode (discharging mode) and the charged voltage value of the second power supply unit 92 is at V(t(n)), and the efficiency Y(t(n)) is associated with the charged voltage value V(t(n)) in Math. 3 such that the efficiency Y(t(n)) changes according to V(t(n)).

$$Y(t(n)) = A \cdot (V(t(n)))^2 + B \cdot V(t(n)) + C \qquad [\text{Math. 3}]$$

Furthermore, a current value I(t(n)) that is discharged from the second power supply unit 92 at time t(n) can be expressed by Math. 4 below.

$$I(t(n)) = \frac{Vout \times Iout}{V(t(n)) \times Y(t(n))} \qquad [\text{Math. 4}]$$

Furthermore, a difference (a time interval) between time t(n) and time t(n−1) can be expressed by Math. 5 below. In Math. 5, C denotes the capacity of the second power supply unit 92.

$$t(n) - t(n-1) = \frac{C \times \Delta V(t(n))}{\frac{1}{2} \times (I(t(n-1)) + I(t(n)))} \qquad [\text{Math. 5}]$$

ΔV(t(n)) can be calculated using the equations shown in Maths. 2 to 5. Note that V(t(1)) calculated from the lower limit voltage X through a backward calculation using the decrease Va is as shown in Math. 6 below.

$$V(t(1)) = X + \int_{t(1)}^{t(n)} \Delta V(t(n)) \times dt \qquad [\text{Math. 6}]$$

V(t(1)) denotes the charged voltage of the second power supply unit 92 at the discharging start time t(1) when the voltage drop caused by the internal resistance of the second power supply unit 92 is not taken into account. The second target voltage value Vt2 when the maximum voltage drop Vd caused by the internal resistance is additionally considered in this relational expression is as shown in Math. 1.

In Math. 1, Vd denotes the maximum voltage drop, and can be expressed by Math. 7 below.

$$Vd = I(t(n)) \times R \qquad [\text{Math. 7}]$$

In Math. 7, R denotes the internal resistance of the second power supply unit 92, and can be expressed by Math. 8 below.

$$R = Kr \times Rb \qquad [\text{Math. 8}]$$

In Math. 8, Kr denotes a temperature correction coefficient for the resistance value, and Rb denotes a reference value for the internal resistance. The temperature correction coefficient for the resistance value has the relationship shown in FIG. 6, and pieces of data such as those shown in FIG. 6 (i.e. pieces of data by which temperatures and temperature correction coefficients for capacity are associated with each other, such as a table and an arithmetic expression) are stored in a memory or the like (not shown). When a temperature correction coefficient for a resistance value is to be calculated, a temperature correction coefficient for a resistance value corresponding to the temperature detected by the temperature detection unit 50 in step S2 of FIG. 3 is acquired from data stored in the memory.

Figure 7:
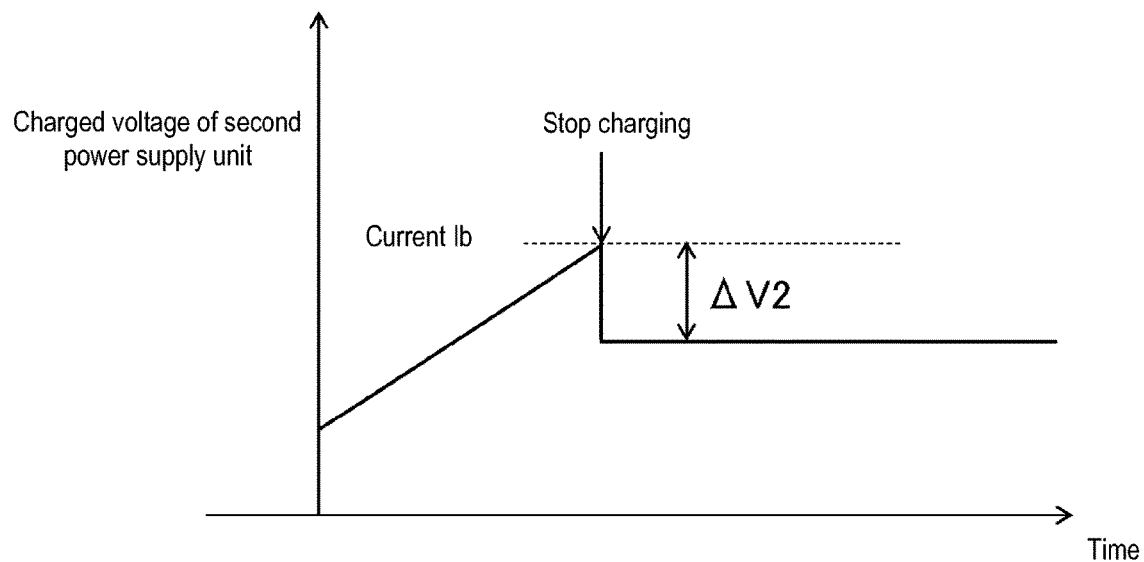
FIG. 7 is a graph illustrating a method for measuring a reference value for a resistance value.

The reference value Rb for the internal resistance can be measured and calculated using the method illustrated in FIG. 7. Specifically, the reference value Rb can be calculated as shown in Math. 9, based on: a change amount ΔV2 of a change in the charged voltage of the second power supply unit 92 from a point in time that is immediately before the charging operation is stopped to a point in time after the charging operation has been stopped in a case where the charging control shown in FIG. 3 is performed and the charging operation is stopped in step S4; and a current (charging current) Ib flowing through the second conductive path 22 immediately before the charging operation is stopped.

$$Rb = \frac{\Delta V2}{Ib} \qquad [\text{Math. 9}]$$

Also, the capacity C of the second power supply unit 92 shown in Math. 5 can be calculated using the equation shown in Math. 10 below, based on a reference value Cb for the capacity and a temperature correction coefficient Kc for the capacity. Note that, in the present configuration, the control unit 5 is an example of the capacity calculation unit.

$$C = Kc \times Cb \qquad [\text{Math. 10}]$$

Figure 8:
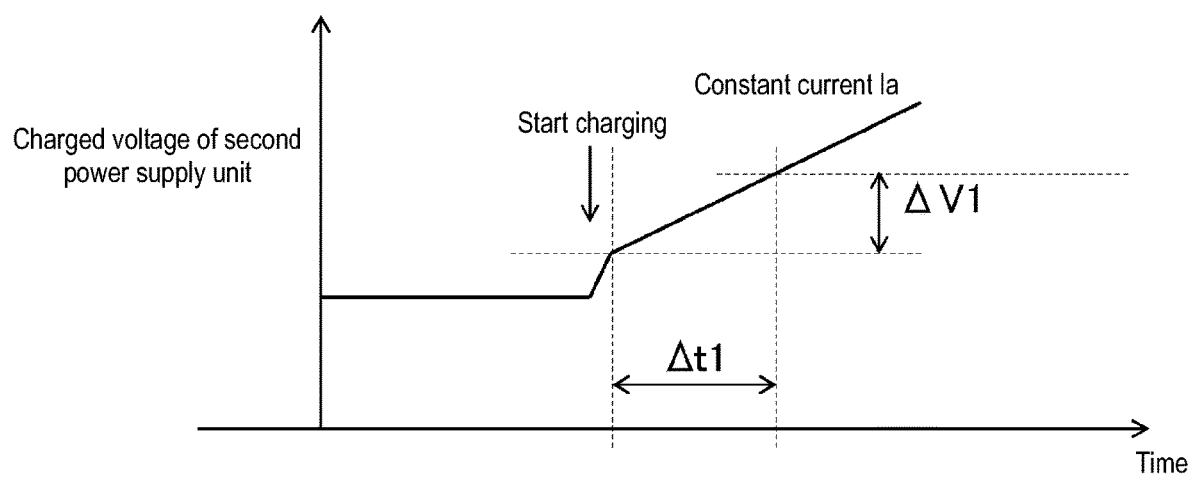
FIG. 8 is a graph illustrating a method for measuring a reference value for a capacity.

The reference value Cb for the capacity can be measured and calculated by the method illustrated in FIG. 8. Specifically, after the charging operation has been started in FIG. 3, if the amount of a change in the charged voltage is ΔV1 when the charging operation has been performed at a constant current Ia for a certain period Δt1, the capacity reference value Cb can be expressed by the equation shown in Math. 11 below. Note that the capacity reference value Cb and the capacity C can be calculated each time the processing in step S2 of FIG. 3 is performed, and the latest capacity C can be used after each calculation.

$$Cb = Ia \times \frac{\Delta t1}{\Delta V1} \qquad \text{[Math. 11]}$$

Figure 6:
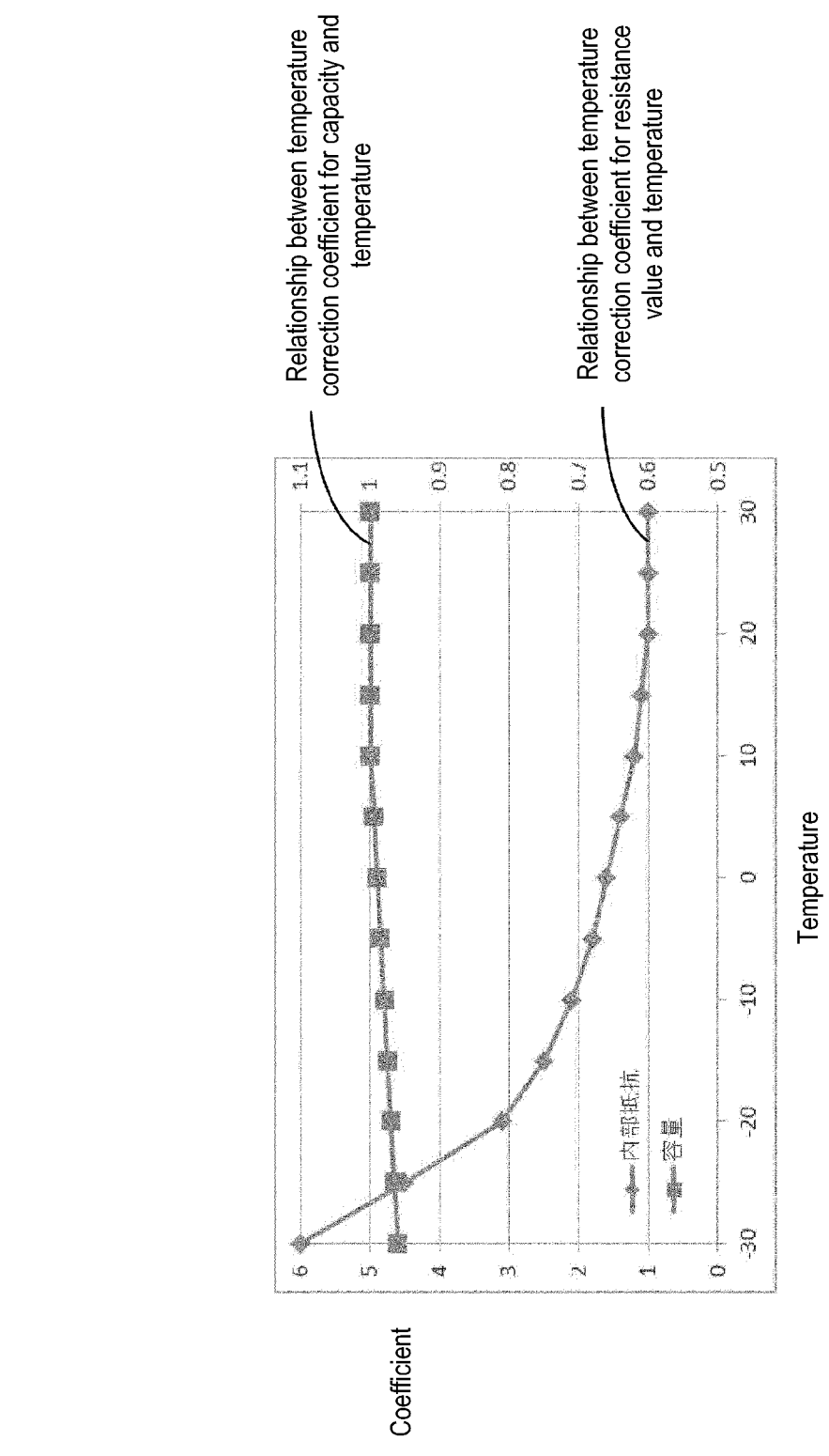
FIG. 6 is a graph showing a relationship between a temperature correction coefficient for a capacity and temperature, and a relationship between a temperature correction coefficient for a resistance value and temperature.

In Math. 10, Kc denotes a temperature correction coefficient for a capacity, and a temperature correction coefficient for a capacity has the relationship shown in FIG. 6. Pieces of data such as those shown in FIG. 6 (i.e. pieces of data by which temperatures and temperature correction coefficients for capacity are associated with each other, such as a table and an arithmetic expression) are stored in a memory or the like (not shown). When a temperature correction coefficient for a capacity is to be calculated, a temperature correction coefficient for a capacity corresponding to the temperature detected by the temperature detection unit 50 in step S2 of FIG. 3 is acquired from data stored in the memory.

The control unit 5 calculates the second target voltage value Vt2 in step S2 of the control shown in FIG. 3 using the above-described calculation method. After the second target voltage value Vt2 has been determined, the control unit 5 monitors the charged voltage (output voltage) of the second power supply unit 92 while continuously performing control to cause the voltage conversion unit 3C to perform a charging operation. Specifically, after step S2, the control unit 5 repeatedly determines whether or not the voltage of the second conductive path 22 has become equal to the above-described second target voltage value Vt2 in step S3, and when the voltage of the second conductive path 22 (specifically, the electrical potential at a detection position where the voltage detection unit 42 performs detection) has become equal to the above-described second target voltage value Vt2 (Yes in step S3), the control unit 5 stops the voltage conversion unit 3C from performing the charging operation in step S4.

In this way, when the starter switch 70 is switched to an ON state (when the external input signal is switched from the IG OFF signal to the IG ON signal), the control unit 5 causes the charging/discharging circuit unit 3 (the charging circuit) to perform a charging operation such that the charged voltage of the second power supply unit 92 reaches the above-described second target voltage value Vt2, and keeps the charged voltage of the second power supply unit 92 at or near the second target voltage value Vt2 during a period in which the starter switch 70 is in an ON state (i.e. during a period in which the vehicle is in a drivable state).

The following describes control that is to be performed when the starter switch 70 is switched from an ON state to an OFF state.

Figure 4:
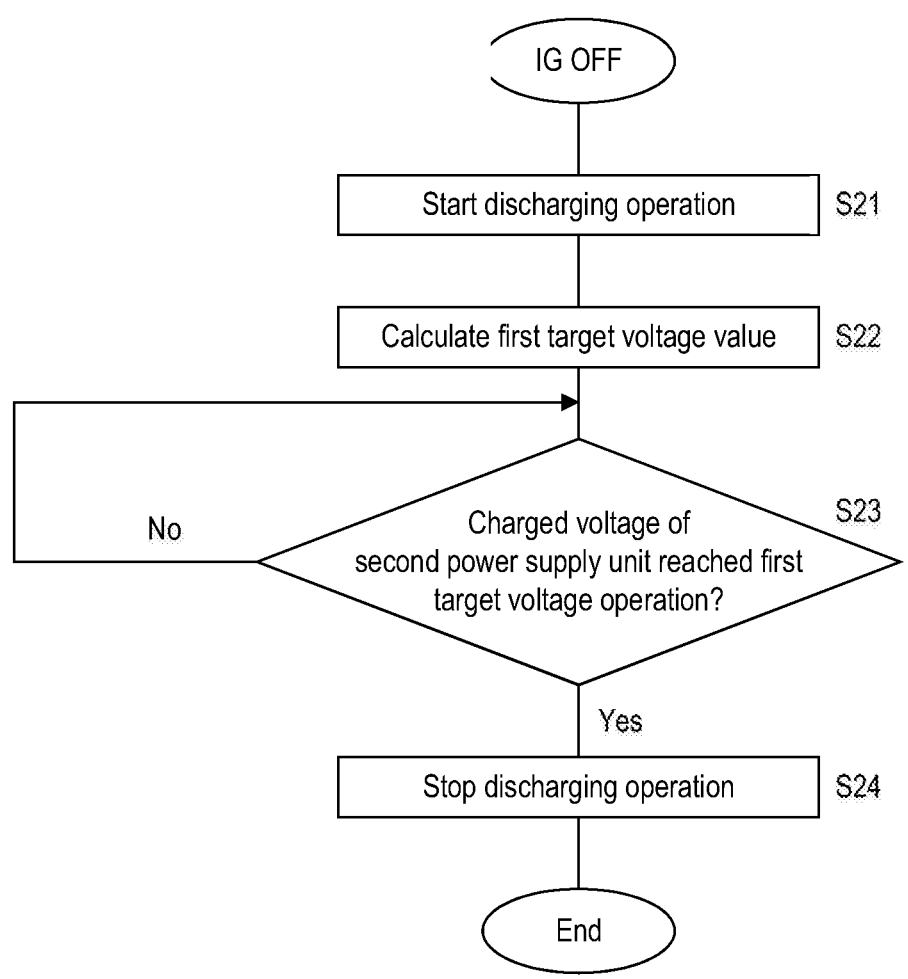
FIG. 4 is a flowchart showing an example of a flow of discharging control that is performed by the backup device according to the first embodiment.

Upon detecting that the signal input from the external device 72 to the control unit 5 has switched from the IG OFF signal to the IG ON signal, the control unit 5 performs charging control shown in FIG. 4. When the control unit 5 starts the charging control shown in FIG. 4, the control unit 5 first performs processing in step S21 to cause the voltage conversion unit 3C to perform the above-described discharging operation. Specifically, in step S21, the control unit 5 starts operating in the above-described second mode (discharging mode), and causes the voltage conversion unit 3C to perform a step-up operation to apply an output voltage of a desired target voltage value to the first conductive path 21, using the second conductive path 22 as an input-side conductive path and the first conductive path 21 as an output-side conductive path. The output voltage value (target voltage value) that the voltage conversion unit 3C applies to the first conductive path 21 may be, for example, substantially the same as the output voltage value of the first power supply unit 91 when fully charged, or slightly higher than this value.

After performing the processing in step S21 to cause the voltage conversion unit 3C to start the charging operation, the control unit 5 performs processing in step S22 to determine a first target voltage value Vt1. The first target voltage value Vt1 is a target value of the charged voltage of the second power supply unit 92 when the starter switch 70 for starting the vehicle is in an OFF state. In the present configuration, the control unit 5 is an example of the determination unit, and determines the first target voltage value Vt1 so as to be lower than the second target voltage value Vt2, based on the second target voltage value Vt2, which is the target voltage value of the second power supply unit 92 when the switch is in an ON state, values that indicate the charging capability of the charging circuit 3A, and a predetermined time limit N. Specifically, the control unit 5, which corresponds to the determination unit, determines the first target voltage value Vt1 using the equation shown in Math. 12 below, based on a voltage of the first conductive path 21 detected by the voltage detection unit 41, a current flowing through the first conductive path 21 detected by the current detection unit 31, the efficiency of the voltage conversion unit 3C calculated by an efficiency calculation unit, the capacity C of the second power supply unit 92 calculated by a capacity calculation unit, the second target voltage value Vt2, and the time limit N. In Math. 12, Is denotes an input current (charging current) flowing to the voltage conversion unit 3C from the first power supply unit 91 when the charging operation is performed, and Vs denotes an input voltage (charged voltage) applied to the first conductive path 21 by the first power supply unit 91 when charging operation is performed. The time limit N is the time limit within which the second target voltage value Vt2 is to be reached after charging is started (within which charging is to be finished), and is the time required to increase the charged voltage of the second power supply unit 92 from the first target voltage value Vt1 to the second target voltage value Vt2 when a charging operation is performed with an input current IS and an input voltage Vs. Y(Vs) denotes the efficiency (converter efficiency) of the voltage conversion unit 3C when the voltage conversion unit 3C operates in the first mode (charging mode) and the input voltage is the voltage Vs, and may be calculated using the equation shown in Math. 3 as the efficiency at the time the voltage is Vs, for example. Alternatively, the converter efficiency (the converter efficiency determined according to the input voltage) in a case where the voltage conversion unit 3C performs an operation in the first mode (a charging operation) may have been determined using table data or an arithmetic expression that determines a converter efficiency for each input voltage. If this is the case, an efficiency that has been determined by such table data or arithmetic expression as a value corresponding to the above-described input voltage Vs may be used as the converter efficiency Y(Vs). Note that, in the present configuration, the control unit 5 is an example of the efficiency calculation unit. Note that Is, Vs, and Y(Vs) may be calculated each time the control shown in FIG. 3 is performed, and in this case, Is, Vs, and Y(Vs) that have been most recently detected may be used in step S22.

$$Is \times Vs \times Y(Vs) \times N = \frac{1}{2} \times C \times (Vt2^2 - Vt1^2) \qquad \text{[Math. 12]}$$

The control unit 5 calculates the first target voltage value Vt1 in step S22 of the control shown in FIG. 4 using the above-described calculation method. After the first target voltage value Vt1 has been determined, the control unit 5 monitors the charged voltage (output voltage) of the second power supply unit 92 while continuously performing control to cause the voltage conversion unit 3C to perform a discharging operation. Specifically, after step S22, the control unit 5 repeatedly determines whether or not the voltage of the second conductive path 22 has become no greater than the above-described first target voltage value Vt1 in step S23, and when the voltage of the second conductive path 22 (specifically, the electrical potential at a detection position where the voltage detection unit 42 performs detection) has become no greater than the above-described first target voltage value Vt1 (Yes in step S23), the control unit 5 stops the voltage conversion unit 3C from performing the discharging operation in step S24.

In this way, when the starter switch is switched to an OFF state (when the external input signal is switched from the IG ON signal to the IG OFF signal), the control unit 5 causes the charging/discharging circuit unit 3 (the discharging circuit) to perform a discharging operation such that the charged voltage of the second power supply unit 92 reaches the first target voltage value Vt1, which has been set using the above-described method. Thereafter, when the charged voltage of the second power supply unit 92 reaches the first target voltage value Vt1, the control unit 5 stops the charging/discharging circuit unit 3 from performing the discharging operation. In this way, the discharging operation is stopped when the charged voltage of the second power supply unit 92 is at the first target voltage value Vt1, and therefore the charged voltage of the second power supply unit 92 is kept at a voltage that is no greater than the first target voltage value Vt1 and that is at or near the first target voltage value Vt1 as long as the starter switch 70 is in an OFF state.

The following describes an operation that is performed in a case where a change from a normal state to an abnormal state occurs when the starter switch 70 (the ignition switch) is in an ON state.

When the starter switch 70 is in an ON state, if an abnormality occurs in power supply from the first power supply unit 91 (e.g. if a ground fault occurs or a wire brakes near the first power supply unit 91) and accordingly a normal voltage is not applied from the first power supply unit 91 to the wire portion 81 via a wire portion 83, the voltage applied to the first conductive path 21 (the +B voltage) is changed from a value that is greater than a threshold value Vth to a value that is no greater than the threshold value Vth. The control unit 5 continuously monitors the voltage of the first conductive path 21 as long as the starter switch 70 is in an ON state, and when the voltage of the first conductive path 21 becomes no greater than the threshold value Vth, the control unit 5 determines that power supply from the first power supply unit 91 is in an abnormal state, and operates in the second mode. Specifically, the control unit 5 causes the voltage conversion unit 3C to perform the above-described discharging operation. Thus, the control unit 5 can back up the load 94. Note that, if a switch (not shown) is provided on the wire portion 83, the wire portion 81 and the first power supply unit 91 may be electrically disconnected from each other by switching the switch to an OFF state.

The following describes examples of advantageous effects of the present configuration.

When the starter switch 70 for starting the vehicle is in an OFF state, the backup device 1 sets the first target voltage value Vt1, which is the target voltage value of the charged voltage of the second power supply unit 92, so as to be lower than the target voltage value in an ON state (the second target voltage value Vt2). In this way, it is possible to keep the charged voltage of the second power supply unit 92 relatively low during a period in which the vehicle's operation has stopped, and accordingly it is possible to suppress the deterioration of the second power supply unit 92. Furthermore, instead of simply lowering the target voltage value of the charged voltage of the second power supply unit 92 during a period in which the vehicle's operation has stopped (the first target voltage value Vt1), it is possible to set the target voltage value based on the target voltage value of the second power supply unit 92 when the switch is in an ON state (the second target voltage value Vt2), values indicating the charging capability of the charging circuit 3A, and the predetermined time limit N. That is to say, it is possible to more appropriately set the target voltage value of the second power supply unit 92 during a period in which the vehicle's operation has stopped (the first target voltage value Vt1) so as to match an envisaged state of charging when the switch is thereafter switched to an ON state, and a demanded time limit N. Note that, in the equation shown in Math. 13, the input current Is and the input voltage Vs and the converter efficiency Y(Vs) are the values indicating the charging capability of the charging circuit 3A.

In this way, the present configuration seeks an appropriate target voltage value (first target voltage value Vt1) of the second power supply unit 92 in an OFF state. Thus, it is possible to swiftly increase the charged voltage of the second power supply unit 92 to a target level after the vehicle has started operating, and it is possible to lower the charged voltage of the second power supply unit 92 to an appropriate level after the vehicle has stopped operating, to suppress deterioration.

The charging circuit 3A includes the voltage conversion unit 3C that steps up or down the voltage applied to the first conductive path 21 electrically connected to the first power supply unit 91, and the resulting voltage to the second conductive path 22 electrically connected to the second power supply unit 92. Furthermore, the backup device 1 includes the voltage detection unit 41 that detects the voltage of the first conductive path 21, the current detection unit 31 that detects a current flowing through the first conductive path 21, the temperature detection unit 50 that detects the temperature of the second power supply unit 92, the efficiency calculation unit that calculates the efficiency of the voltage conversion unit 3C based on the voltage detected by the voltage detection unit 41, and the capacity calculation unit that calculates the capacity C of the second power supply unit 92 based on the temperature detected by the temperature detection unit 50. Using the above-described equation shown in Math. 12, the determination unit functions to determine the first target voltage value Vt1 based on the voltage Vs of the first conductive path 21 detected by the voltage detection unit 41 (e.g. the voltage Vs of the first conductive path 21 at the start time of step S22), the current Is flowing through the first conductive path 21 detected by the current detection unit 31 (e.g. the current Is flowing through the first conductive path 21 at the start time of step S22), the efficiency of the voltage conversion unit 3C calculated by the efficiency calculation unit (the converter efficiency Y(Vs) determined by the above-described voltage Vs when the voltage conversion unit 3C operates in the first mode), the capacity C of the second power supply unit 92 calculated by the capacity calculation unit, the second target voltage value Vt2, and the time limit N.

The backup device 1 with such a configuration can determine the target voltage value (the first target voltage value Vt1) of the second power supply unit 92 when the starter switch 70 is in an OFF state such that, in addition to the target voltage value (the second target voltage value Vt2) of the second power supply unit 92 when the switch is in an ON state and the predetermined time limit N, the voltage and the current of the charging path (the first conductive path 21) from the first power supply unit 91 to the second power supply unit 92, the efficiency of the voltage conversion unit 3C, and the capacity of the second power supply unit 92 are reflected to the target voltage value. That is to say, the backup device 1 can more appropriately set the target voltage value (the first target voltage value Vt1) of the second power supply unit 92 during a period in which the vehicle's operation has stopped, such that an envisaged state of charging after the switch has been turned ON (after the vehicle's operation has started) is more specifically and more precisely reflected to the target voltage value.

The backup device 1 includes the second determination unit that determines the second target voltage value based on the predetermined continuous output period T determined in advance as a requested value for the second power supply unit 92, the lower limit voltage X determined in advance as the value of the dischargeable lower limit of the second power supply unit 92, and the values indicating the discharging capability of the discharging circuit 3B (Vout and Tout in Math. 4). Specifically, in FIG. 5, Va is a decrease in voltage determined based on the continuous output period T and the values indicating the discharging capability of the discharging circuit 3B (Vout and Tout in Math. 4) (a decrease in voltage when the time period T has elapsed in a case where discharging is performed at the output voltage Vout and the output current Tout during the time period T from time t(1) to time t(n)), and Va is the integral term in Math. 1. Vt2 can be calculated using an equation Vt2=Vd+X+Va based on Va, the lower limit voltage X, the maximum voltage drop Vd caused by the internal resistance of the second power supply unit 92 (a voltage drop when the current flowing from the second power supply unit 92 is the current I(t(n)).

The backup device 1 with such a configuration can more appropriately set not only the target voltage value of the second power supply unit 92 when the switch for starting the vehicle is in an OFF state (the first target voltage value Vt1), but also the target voltage value when the switch is in an ON state (the second target voltage value Vt2). Specifically, the backup device 1 can make appropriate settings based on the predetermined continuous output period T determined in advance as a requested value for the second power supply unit 92, the lower limit voltage X determined in advance as the value of the dischargeable lower limit of the second power supply unit 92, and the values indicating the discharging capability of the discharging circuit 3B such that the time and discharging environment that are required after the switch has been switched to the ON state are specifically reflected to the settings.

Other Embodiments

The present disclosure is not limited to the embodiment described in the above description with reference to the drawings, and, for example, the following embodiments also fall within the technical scope of the present disclosure.

In the above-described first embodiment, a lead battery is used in the first power supply unit 91. However, the present disclosure is not limited to such a configuration, and in any of the examples in the present description, another power supply means (e.g. another well-known electricity storage means such as a lithium-ion battery, or a power generation means) may be used in the first power supply unit 91 instead of, or together with, a lead battery. The first power supply unit 91 is not necessarily constituted by one power supply means, and may be constituted by a plurality of power supply means.

In the above-described first embodiment, an electric double-layer capacitor (EDLC) is used in the second power supply unit 92. However, the present disclosure is not limited to such a configuration, and in any of the examples in the present description, another electricity storage means such as a lithium-ion battery, a lithium-ion capacitor, or a nickel metal-hydride rechargeable battery may be used in the second power supply unit 92. Also, the second power supply unit 92 is not necessarily constituted by one electricity storage means, and may be constituted by a plurality of electricity storage means.

The first embodiment shows a configuration in which the second power supply unit 92 is provided outside the backup device 1. However, the second power supply unit 92 may be configured a part of the backup device 1.

In the first embodiment, the voltage conversion unit 3C has the function of the charging circuit 3A and the function of the discharging circuit 3B. However, the charging circuit 3A and the discharging circuit 3B may be configured as separate circuits.

The first embodiment shows an example in which the second target voltage value Vt2, which is the target voltage value of the second power supply unit 92 when the starter switch 70 is in an ON state, is calculated using the above-described calculation method. However, the second target voltage value Vt2 may be a fixed value that is lower than the charged voltage of the second power supply unit 92 when fully charged.

The first embodiment shows an example in which the second target voltage value Vt2, which is the target voltage value of the second power supply unit 92 when the starter switch 70 is in an ON state, is calculated based on Math. 1. However, the second target voltage value Vt2 may be calculated by setting the terms other than the maximum voltage drop Vd in Math. 1 to be fixed values. That is to say, Va and X shown in FIG. 5 may be set to fix values, and the second target voltage value Vt2 may be calculated using an equation Vt2=Vd+X+Va. In other words, the value of Va may be calculated in real time using the above-described method, and approximated to a predetermined fixed value. If Va is calculated in real time, a method other than the calculation method described above in the first embodiment may be used. For example, the voltage conversion unit 3C may perform discharging at the output voltage Vout and the output current Iout during a predetermined period until the voltage reaches the lower limit voltage X, a measurement mode in which a relationship between the elapsed time of the discharging and the charged voltage of the second power supply unit is monitored may be executed, the charged voltage of the second power supply unit 92 at a point in time that is backward by the time period T from the point in time when the lower limit voltage X is reached may be calculated, and this charged voltage may be determined as Va+X, i.e. V(t(1)). If a fixed value is used, the value of Va may be determined in advance as a fixed value that is based on the continuous output period T and the values indicating the discharging capability of the discharging circuit 3B (Vout and Iout in Math. 4). For example, in the backup device 1 before the product is shipped, when the output voltage of the second power supply unit 92 before the discharging is started is V(t(1)), V(t(1)) that satisfies a relationship in which, in a case where the voltage conversion unit 3C performs discharging at the output voltage Vout and the output current Iout under a determined temperature condition during the time period T, the output voltage of the second power supply unit 92 when the time period T has elapsed is X may be used as a fixed value (an approximated value) corresponding to the above-described X+Va.

The invention claimed is:

1. A vehicle backup device that is to be included in a vehicle power supply system that is provided with a first power supply unit that is electrically connected to a first conductive path, and a second power supply unit that serves as a power supply source at least when power supply from the first power supply unit is abnormal, the vehicle backup device controlling charging and discharging of the second power supply unit, the vehicle backup device comprising:
 a charging circuit that performs a charging operation to charge the second power supply unit, and a charging stop operation to stop charging the second power supply unit, based on power supplied from the first power supply unit via the first conductive path;
 a discharging circuit that performs a discharging operation to discharge the second power supply unit, and a discharging stop operation to stop discharging the second power supply unit;
 a voltage detection unit that detects the voltage of the first conductive path;
 a current detection unit that detects a current flowing through the first conductive path;
 a determination unit that determines a first target voltage value that is a target voltage value of the second power supply unit when a starter switch for starting a vehicle is in an OFF state and is calculated using the voltage detected by the voltage detection unit and the current detected by the current detection unit, so as to be lower than a second target voltage value that is a target voltage value of the second power supply unit when the starter switch is in an ON state and is a charged voltage that is required to continue a discharging operation for a predetermined period of time, based on the second target voltage value, the voltage of the first conductive path detected by the voltage detection unit while the charging circuit performs the charging operation, the current flowing through the first conductive path detected by the current detection unit while the charging circuit performs the charging operation, and a predetermined time limit; and
 a control unit that causes the charging circuit to perform the charging operation upon the starter switch being switched to an ON state, such that the charged voltage of the second power supply unit reaches the second target voltage value, and causes the discharging circuit to perform the discharging operation upon the starter switch being switched to an OFF state, such that the charged voltage of the second power supply unit reaches the first target voltage value determined by the determination unit.

2. The vehicle backup device according to claim 1, wherein the charging circuit includes a voltage conversion unit that steps up or down a voltage applied to the first conductive path that is electrically connected to the first power supply unit, and applies the resulting voltage to a second conductive path that is electrically connected to the second power supply unit,
 the vehicle backup device further comprises:
 the voltage detection unit that detects the voltage of the first conductive path;
 the current detection unit that detects a current flowing through the first conductive path;
 a temperature detection unit that detects the temperature of the second power supply unit;
 an efficiency calculation unit that calculates the efficiency of the voltage conversion unit based on the voltage detected by the voltage detection unit; and
 a capacity calculation unit that calculates the capacity of the second power supply unit based on the temperature detected by the temperature detection unit, and
 the determination unit determines the first target voltage value based on the voltage of the first conductive path detected by the voltage detection unit, the current flowing through the first conductive path detected by the current detection unit, the efficiency of the voltage conversion unit calculated by the efficiency calculation unit, the capacity of the second power supply unit calculated by the capacity calculation unit, the second target voltage value, and the time limit.

3. The vehicle backup device according to claim 2, further comprising:
 a second determination unit that determines the second target voltage value based on a predetermined continuous output period that has been determined in advance as a requested value for the second power supply unit, a lower limit voltage that has been determined in advance as a lower limit value that is dischargeable from the second power supply unit, and a value indicating the discharging capability of the discharging circuit.

4. The vehicle backup device according to claim 2, further comprising:
 a second determination unit that determines the second target voltage value based on a predetermined continuous output period that has been determined in advance as a requested value for the second power supply unit, a lower limit voltage that has been determined in advance as a lower limit value that is dischargeable from the second power supply unit, and a value indicating the discharging capability of the discharging circuit.

* * * * *